Dec. 12, 1939.    R. S. HART    2,183,333
ELECTRONIC DISCHARGE TESTING DEVICE AND CONTACTOR
Filed July 8, 1936
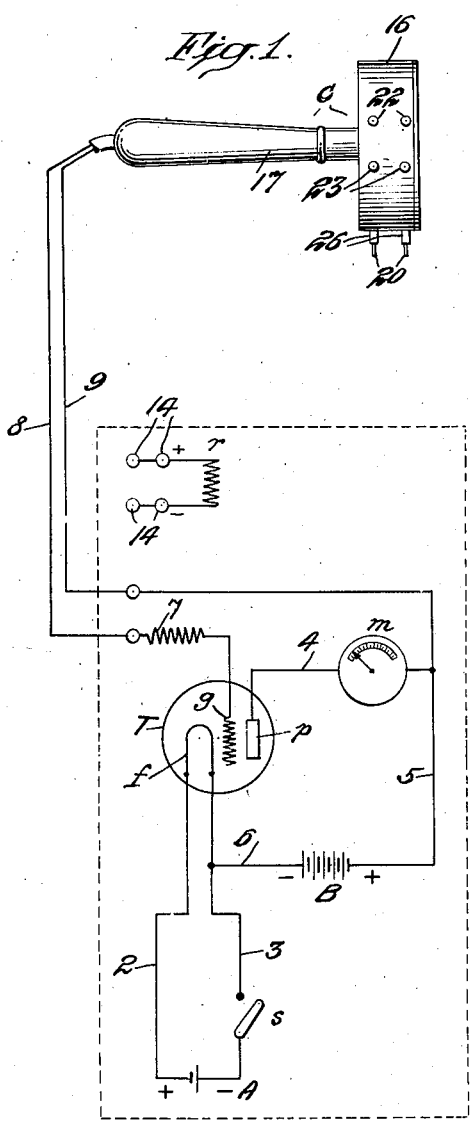
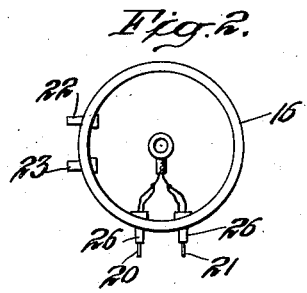
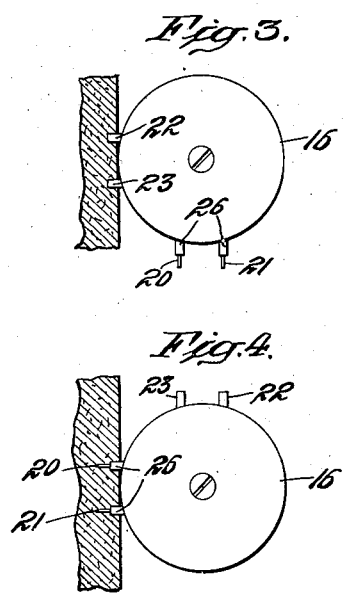
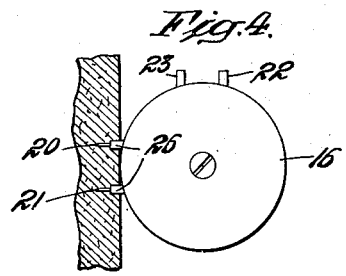
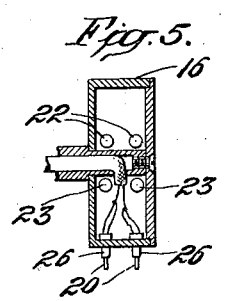
INVENTOR
RAYMOND S. HART
BY
ATTORNEY Patented Dec. 12, 1939

2,183,333

UNITED STATES PATENT OFFICE 2,183,333

ELECTRONIC DISCHARGE TESTING DEVICE AND CONTACTOR

Raymond S. Hart, Brooklyn, N. Y., assignor to Harry Hull St. Clair, Montclair, N. J.

Application July 8, 1936, Serial No. 89,669

3 Claims. (Cl. 175—183)

This invention relates to devices for determining the relative conductivity of materials for ascertaining the degree of moisture content or other properties as may be related to or influenced by the electric conductivity of the material under test.

The improved instrument of the present invention is of the type employing a triode electronic tube and energizing circuit and ammeter with means for closing of the circuit through the material under test for comparative reading with relation to a standard or known value resistance suitably protected to be invariable in its electrical conductivity and resistance value. An important feature of my improved device resides in a simplified arrangement designed to eliminate certain variable or loss factors heretofore present in supersensitive gauging devices of this type and related to the leads and method of contact.

In the instruments of the general type as commonly employed for obtaining comparative conductivity readings duplicate amplified circuits are employed, one of which includes in series a standard resistance of known value and the other through suitable leads and contacts is closed through the material under test for making a comparative reading. This arrangement, while satisfactory under ideal conditions, I have found to be subject to variations incident to conditions affecting the lead wires and contacts such as varied humidity of the atmosphere and the moisture influence of the tester's hand in handling the contactor member which affect the readings in the super-sensitive circuit employed. The resulting inaccuracies are to a large degree avoided by my improved device which employs the same leads and contact member in closing each of the circuits whereby all variables are similarly present and the circuit conditions more closely correspond for the standard resistance and test material readings.

As further contributing to the accuracy of the reading I employ an improved contactor member specially designed for making contact or terminal connection with the material to be tested within the body thereof so as to eliminate the surface moisture influence ordinarily present.

The aforementioned and other important features and advantages of my improved device will be more fully understood from the following detailed description and by reference to the accompanying drawing wherein like reference characters are applied to the corresponding parts in the several views.

In the drawing:

Fig. 1 is a diagrammatic view of the improved circuit and contact arrangement of my improved device in a simplified embodiment thereof.

Fig. 2 is a view in end elevation of the contactor member employed therewith with the front panel removed.

Fig. 3 is a view of the contactor member in end elevation illustrating the initial piercing operation.

Fig. 4 is a similar view showing the testing contact.

Fig. 5 is a detailed sectional view of the contact member.

In the approved embodiment of the features of my invention as here shown, a single triode electronic tube T is employed having the usual filament $f$, grid $g$ and plate $p$. The circuit arrangement for energizing the tube as shown includes the conductors or leads 2—3 in series with the filament $f$ and connected to the opposite poles of battery A; connection 4 from the plate $p$ having ammeter or galvanometer $m$ in series therewith and connected by wire 5 to one pole of the battery B, the latter having its opposite pole connected by wire 6 to connection 3. The grid circuit is employed as the testing circuit and includes the flexible contactor leads or connections 8—9 connected to the grid $g$ through a protective resistance 7 and to battery B connection 5. The contactor leads, as best shown in Fig. 2, are connected to terminal pins of a contactor member C especially adapted for making contact with the material to be tested to close the circuit therethrough in a manner to give accurate reading or calibration of the conductivity thereof. At S is shown a switch to control the filament circuit.

In the employment of my improved device for obtaining an informative reading of the relative conductivity of the material under test, the grid or testing circuit is closed by means of the contactor member through the material under test and for comparison through a standard or known value resistance adapted for circuit closing contact with the contactor member.

As a result an accurate comparative reading is obtained including in each instance all variables as to conditions of tubes, batteries, effect of dampness of the atmosphere upon the complete testing circuit including the leads and contactor member thereof. The meter scale may in consequence be purely arbitrary and all calculations may be based upon a comparison of the readings through the known value or conductivity resistance with the reading given by the circuit through the material under test.

To this end, a fixed resistance of known value, indicated at r is incorporated with the device and which may be a resistance coil suitably protected from the influence of moisture and having terminal members 14 spaced to be contacted by the co-operating terminal members or pins of the contactor member for closing of the circuit through the resistance.

The contactor member, as shown in Figs. 2 and 3, consists of an insulated body or head portion 16 provided with an insulated handle 17 having a central bore therethrough for the flexible leads to enter the head where they are connected to the duplicate set of contact pins 20—21 arranged to project radially from the head member. The duplication of the pins served to insure good electrical contact with the material to be tested. In addition, there are provided noncircuit pins 22—23 of a larger gauge than the pins 20—21 and arranged at right angles thereto and in similarly spaced relation, these pins 22—23 being adapted to be employed for making an initial hole or indentation in the test material by striking of the head member at a point opposite to the pins.

The contact pins 20—21, which are elongated and of smaller gauge than the pins 22—23, have their base or inner portions insulated by insulating collars 26 for a distance corresponding to the length of the pins 22—23, the collars having a diameter permitting them to be received within the holes made by the pins 22—23 in the material to be tested. This spacing arrangement of the pins 20—21 corresponds to that of the pins 22—23 which permits the pins 20—21 to be entered within the holes made by the pins 22—23 and upon striking of the opposite portion or surface of the head the contact pins 20—21 are caused to penetrate the material inward of the bottom of the holes with the outer portions insulated whereby the test reading will be that of material well within the body thereof and non-influenced by the customarily present surface moisture absorbed by the material from atmospheric exposure.

While I have shown and described an approved and simplified embodiment of the features of my invention, it will be understood that many modifications may be made therein without departing from the scope of the invention as defined in the appended claims.

Having described my invention, I claim:

1. A contactor member for electronic discharge testing circuits comprising a body member provided with testing circuit terminal pins projecting therefrom in spaced relation, said terminal pins having insulated inner portions and exposed outer portions and said head being provided with correspondingly spaced pins adapted for initially piercing the material for the reception of the testing terminal pins, substantially as described.

2. A contactor member for electronic discharge testing circuits comprising a body member provided with testing circuit terminal pins projecting therefrom in spaced relation, said terminal pins having insulated inner portions and exposed outer portions of lesser diameter and said head being provided with correspondingly spaced pins adapted for initially piercing the material with holes of a diameter adapted to receive therein the insulated portions of the terminal pins whereby the terminal pins will effect electrical connection within the body of the material under test.

3. A contactor member for electronic discharge testing circuits comprising a body member provided with testing circuit terminal pins projecting therefrom in spaced relation, said terminal pins having insulated inner portions and exposed outer portions of lesser diameter and said head being provided with correspondingly spaced pins adapted for initially piercing the material with holes of a diameter adapted to receive therein the insulated portions of the terminal pins and said terminal and piercing pins being relatively positioned on the head member to permit of the latter being struck upon a surface opposite to the pins for driving of the pins into the material to be tested.

RAYMOND S. HART.